(12) United States Patent
Keller et al.

(10) Patent No.: US 7,069,142 B2
(45) Date of Patent: Jun. 27, 2006

(54) METHOD FOR OPERATING AN INTERNAL COMBUSTION ENGINE

(75) Inventors: Torsten Keller, Bobenthal (DE); Sinan Yilman, Pluederhausen (DE); Boris Koehler, Vaihingen/Enz (DE); Christian Schuler, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/989,950

(22) Filed: Nov. 15, 2004

(65) Prior Publication Data

US 2005/0125139 A1 Jun. 9, 2005

(30) Foreign Application Priority Data

Nov. 27, 2003 (DE) ................. 103 55 335

(51) Int. Cl.
*G01M 15/10* (2006.01)

(52) U.S. Cl. ..................... 701/114; 73/119 R

(58) Field of Classification Search .............. None
See application file for complete search history.

(56) References Cited

U.S. PATENT DOCUMENTS

| | | | |
|---|---|---|---|
| 6,948,358 B1* | 9/2005 | Weiss et al. | 73/119 R |
| 2003/0110845 A1* | 6/2003 | Kumagai et al. | 73/116 |
| 2005/0204805 A1* | 9/2005 | Wakahara et al. | 73/118.1 |

* cited by examiner

*Primary Examiner*—Andrew M. Dolinar
(74) *Attorney, Agent, or Firm*—Kenyon & Kenyon, LLP

(57) ABSTRACT

A method for operating an internal combustion engine, in which an erroneous lift of an intake valve of a cylinder is directly determined. The lift of an intake valve of at least one cylinder of the internal combustion engine is diagnosed. A value for a specific cylinder which is representative of the air/fuel ratio in the respective cylinder is determined in an exhaust system branch of the internal combustion engine. At least one such value is compared to a predefined value. An erroneous lift of the intake valve is diagnosed as a function of the deviation of this at least one value from the predefined value.

8 Claims, 2 Drawing Sheets

METHOD FOR OPERATING AN INTERNAL COMBUSTION ENGINE

BACKGROUND INFORMATION

Methods for operating an internal combustion engine are known in which the lift of an intake valve of an engine cylinder is diagnosed. This is accomplished using optical or electronic sensor systems in the corresponding intake valve itself and thus involves considerable hardware complexity. Diagnosing the valve lift of the intake valves via the uneven running of the engine is also known. However, this only works in a satisfactory manner during idling and at higher speeds. Finally, diagnosing the valve lift of the intake valve via partial vibrations in the camshaft is also known. However, in this case it is impossible to determine which cylinder has the defective intake valve.

SUMMARY OF THE INVENTION

The method according to the present invention for operating an internal combustion engine has the advantage over the related art that a value for a specific cylinder, which is representative of the air/fuel ratio in that cylinder, is determined in an exhaust system branch of the internal combustion engine, and at least one such value is compared with a predefined value, and an erroneous lift of the intake valve is diagnosed as a function of the deviation of this at least one value from the predefined value. This makes it possible to diagnose an erroneous valve lift of each individual intake valve, and to determine which cylinder has the defective intake valve. This does not require sensors in the particular intake valve.

It is particularly advantageous if the at least one value is determined using a lambda sensor in the exhaust system branch. In this way, it is possible to use an existing lambda sensor and to diagnose the valve lift without additional sensors in a consequently simple and inexpensive manner.

Another advantage results if the at least one value is representative of the air/fuel ratio in the cylinder associated with the intake valve to be diagnosed. This makes it possible to directly diagnose the valve lift of the intake valve of the associated cylinder by comparing the at least one value with the predefined value. This is accomplished in a particularly simple and inexpensive manner.

It is also particularly advantageous if the at least one value is representative of the air/fuel ratio in at least one cylinder other than the cylinder associated with the intake valve to be diagnosed. In this way an erroneous valve lift of an intake valve may be diagnosed at least indirectly in a very simple manner, but, depending on the number of cylinders, does not allow determination of which cylinder has the defective intake valve, and usually requires analysis of a plurality of such values for this purpose.

It is furthermore advantageous if the at least one value is associated with a cylinder depending on the geometry of the exhaust system branch and the resulting cylinder-specific run time of the exhaust gas packets and on the firing sequence. In this way, it is possible to reliably determine which cylinder has a defective intake valve.

It is furthermore advantageous if, when the exhaust system branch has an asymmetric design, at least one speed range of the engine in which exhaust gas packets of different cylinders are simultaneously detected in the exhaust system branch is excluded from the diagnosis. This prevents misdiagnosis.

Misdiagnosis may also be advantageously prevented by setting an upper limit to a speed range in which diagnosis is allowed, as a function of a sampling frequency in detecting exhaust gas packets of different cylinders in the exhaust system branch.

It is also possible to advantageously prevent misdiagnosis by setting an upper limit to a speed range in which diagnosis is allowed as a function of the number of cylinders.

Diagnosis is particularly simple if the at least one value is selected as a lambda value.

DETAILED DESCRIPTION

Figure 1:
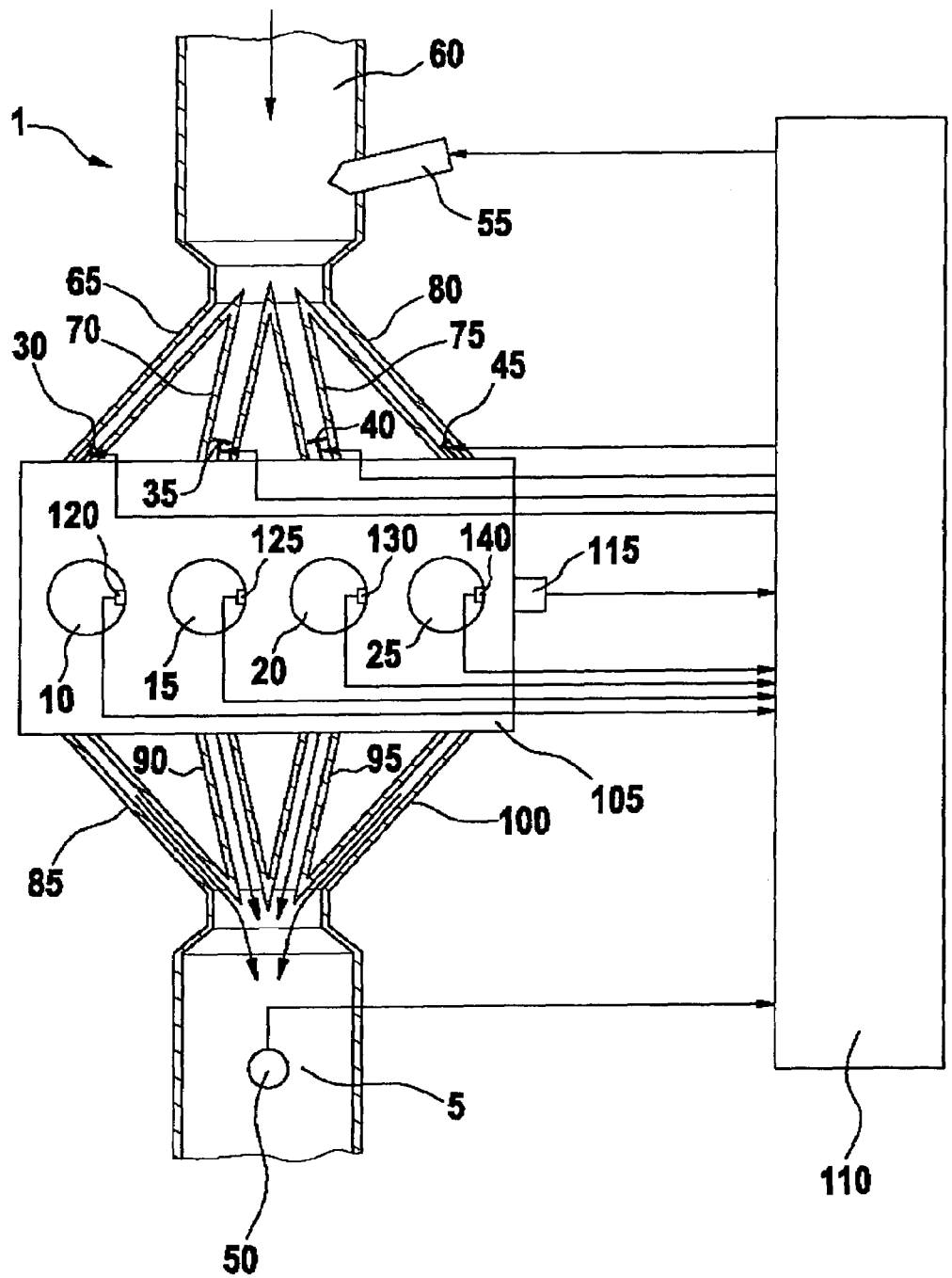
FIG. 1 shows a block diagram of an internal combustion engine.

In FIG. 1, reference numeral 1 designates an internal combustion engine, of a motor vehicle in particular. Internal combustion engine 1 includes a combustion engine 105, which may be designed as a gasoline engine or a diesel engine. In the following it will be assumed as an example that combustion engine 105 is designed as a gasoline engine. Also as an example, combustion engine 105 has four cylinders 10, 15, 20, 25. Combustion engine 105 receives fresh air via air supply 60. Injector 55, through which fuel is injected into a section of air supply 60 designated as an intake pipe and not shown in detail in FIG. 1, is positioned in air supply 60. The fuel mass to be injected is set by a controller 110, for example, by controlling the injection time and an injection pressure of injector 55. The fuel mass to be injected is determined by controller 110 for setting a desired air/fuel mix ratio. As an alternative to the implementation of the injection as illustrated and described above, direct fuel injection triggered by controller 110 into the combustion chambers of individual cylinders 10, 15, 20, 25 may also take place via an injector for each cylinder.

Before reaching combustion engine 105, air supply 60 is split into four inlet channels 65, 70, 75, 80, which transport fresh air to the individual cylinders 10, 15, 20, 25. A first cylinder 10 is associated with a first inlet channel 65 having a first intake valve 30. A second cylinder 15 is associated with a second inlet channel 70 having a second intake valve 35. A third cylinder 20 is associated with a third inlet channel 75 having a third intake valve 40. A fourth cylinder 25 is associated with a fourth inlet channel 80 having a fourth intake valve 45.

Intake valves 30, 35, 40, 45 are triggered in this example by controller 110 to open or close. As an alternative, intake valves 30, 35, 40, 45 may also be opened and closed by an adjustable camshaft. In addition, intake valves 30, 35, 40, 45 are triggered in this example by controller 110 to set a predefined valve lift. In this way, the fresh-air charge of the individual cylinders 10, 15, 20, 25 may be varied individually for each cylinder and/or to alleviate the load on a throttle valve not shown in FIG. 1 in air supply 60, and/or to minimize the charge cycle losses or even to avoid such a throttle valve by varying the valve lift of the individual intake valves 30, 35, 40, 45.

A relatively large valve lift of an intake valve allows a relatively high charge of the corresponding cylinder to be achieved and a relatively small valve lift of an intake valve allows a relatively low charge of the corresponding cylinder to be achieved. A speed sensor 115 is also positioned at combustion engine 105, the speed sensor measuring the rotational speed of the crankshaft of combustion engine 105 and thus the engine speed and relays the measurement result to controller 110. The exhaust gas produced by the combustion of the air/fuel mixture supplied to the combustion chambers of individual cylinders 10, 15, 20, 25 is supplied to an exhaust system branch 5 via corresponding outlet channels 85, 90, 95, 100.

First cylinder 10 is associated with first outlet channel 85 having an outlet valve not illustrated in FIG. 1. Second cylinder 15 is associated with second outlet channel 90 having an outlet valve not illustrated in FIG. 1. Third cylinder 20 is associated with third outlet channel 95 having an outlet valve not illustrated in FIG. 1. Fourth cylinder 25 is associated with fourth outlet channel 100 having an outlet valve not illustrated in FIG. 1. In FIG. 1 the individual outlet channels 85, 90, 95, 100 are arranged symmetrically so that the length of first outlet channel 85 is equal to the length of fourth outlet channel 100, and the length of second outlet channel 90 is equal to the length of third outlet channel 95.

A lambda sensor 50, which measures the oxygen level of the exhaust gas in exhaust system branch 5 and relays the measurement result to controller 110, is situated in exhaust system branch 5. The spark plugs for igniting the air/fuel mixture in individual cylinders 10, 15, 20, 25 and their triggering regarding ignition time and firing sequence by controller 110 are not shown in FIG. 1.

The outlet valves of individual outlet channels 85, 90, 95, 100 open sequentially as a function of the firing sequence. Furthermore, outlet channels 85, 90, 95, 100 have approximately the same length. In this way, the exhaust gas packets of individual cylinders 10, 15, 20, 25 pass by lambda sensor 50 sequentially. The run time of the exhaust gas packets in individual outlet channels 85, 90, 95, 100 is approximately the same. The interval between the individual exhaust gas packets of the different cylinders 10, 15, 20, 25 decreases as the rotational speed increases. The measurement result of lambda sensor 50 is transmitted to controller 110 in the form of a continuous measuring signal. Controller 110 samples the measuring signal in a predefined time grid. For example, sampling may take place in a 1 ms time grid. From the measuring signal of lambda sensor 50, i.e., from the measured oxygen level in the exhaust gas of exhaust system branch 5, controller 110 determines air/fuel ratio lambda in individual cylinders 10, 15, 20, 25. Controller 110 is able to determine the run time of the exhaust gas packets generated by individual cylinders 10, 15, 20, 25 on the basis of the geometry known in controller 110, in particular the length of outlet channels 85, 90, 95, 100 and the location of lambda sensor 50 in the exhaust system branch. The firing sequence of individual cylinders 10, 15, 20, 25, i.e., the sequence of the working cycles of individual cylinders 10, 15, 20, 25, and thus the times of opening of the outlet valves of individual cylinders 10, 15, 20, 25 are also known in controller 110. From the known firing sequence and the known run time of the exhaust gas packets of individual cylinders 10, 15, 20, 25, controller 110 is thus able to uniquely assign a sampling value of the measuring signal of lambda sensor 50 taken at any point in time to an exhaust gas packet of one of cylinders 10, 15, 20, 25 and thus to the corresponding cylinder 10, 15, 20, 25 itself. Controller 110 is thus able to determine air/fuel mix ratio lambda for each cylinder 10, 15, 20, 25.

According to the present invention, each lambda value of individual cylinders 10, 15, 20, 25 is compared to a predefined value, the predefined value being able to be equal to one when a stoichiometric ratio is desired. In the case of a valve lift switchover of intake valves 30, 35, 40, 45 to change the charge of individual cylinders 10, 15, 20, 25, it may happen that one or more of intake valves 30, 35, 40, 45 does not carry out the valve lift switchover. Such an erroneous valve lift is able to be diagnosed using the method according to the present invention.

For example, if all intake valves 30, 35, 40, 45 are switched over from a large valve lift to a small valve lift, for example, within one camshaft revolution, the fuel supply is adjusted accordingly, so that the predefined value of the air/fuel ratio in individual cylinders 10, 15, 20, 25 is preserved. Therefore, the fuel supply is also reduced in the case of the above-described valve lift switchover. If one of cylinders 10, 15, 20, 25 continues to function erroneously with a large valve lift, the associated lambda value detected by controller 110 increases to greater than one, i.e., the air/fuel mixture in this cylinder becomes much leaner. In addition, this cylinder receives an excessive proportion of the available charge compared to the other cylinders. The other cylinders thus have less charge available, so that the air/fuel mixture ratio in these cylinders becomes slightly richer, i.e., the corresponding lambda values drop below one. The degree of leanness in the cylinder having the defective intake valve is much higher than the degree of richness in the other cylinders. The reverse applies in the case of an error when switching from a small valve lift to a large valve lift. In this case, the cylinder having the defective intake valve, which in this case remains stuck at a low lift, receives a much richer mix, while the other cylinders receive a slightly leaner mix.

In the case of such valve lift switchovers, controller 110 analyzes the deviation of the actual lambda value detected by lambda sensor 50 in individual cylinders 10, 15, 20, 25 from the predefined lambda value and determines on this basis whether one of cylinders 10, 15, 20, 25 has a defective intake valve, making it possible to also identify the corresponding cylinder. Because the deviation of the actual lambda value of the cylinder having the defective intake valve from the predefined lambda value is considerably greater than the deviation of the actual lambda values of the other cylinders having non-defective intake valves from the predefined lambda value, a first threshold value may be selected, with which the individual deviations are compared, the absolute value of the first threshold value being able to be selected to be less than the deviation of the actual lambda value of the cylinder having the defective intake valve and greater than the deviation of the actual lambda values of the other cylinders having non-defective intake valves. The first threshold value may be calibrated in this sense on a test bench, for example. The selection of a second threshold value, whose absolute value is less than the deviation of the actual lambda value of the other cylinders having non-defective intake valves may also be calibrated on a test bench, for example, and makes it possible to detect at least that one of intake valves 30, 35, 40, 45 is defective. The absolute value of the second threshold value may also be selected such that deviations of the lambda values of individual cylinders 10, 15, 20, 25 from the predefined lambda value do not result in errors of intake valves 30, 35, 40, 45 being detected due to the measurement tolerances of lambda sensor 50 and component tolerances of individual intake valves 30, 35, 40, 45. This may be taken into account when calibrating the second threshold value.

Alternatively, a single threshold value may be predefined, whose absolute value approximately corresponds to the absolute value of the above-mentioned second threshold value, the sign of the deviations being taken into account when comparing the deviations with this single threshold value. Because it is known in controller 110 whether the valve lift switchover occurs from large lift to small lift or vice-versa, a single threshold value and consideration of the sign of the deviations are sufficient to determine whether and when which intake valve(s) 30, 35, 40, 45 is (are) defective.

For the method according to the present invention to be applicable over the entire available speed range of internal combustion engine 1, a symmetrical design of outlet channels 85, 90, 95, 100 as shown in FIG. 1 is required. Otherwise, i.e., in the case of asymmetric design of exhaust system branch 5, i.e., outlet channels 85, 90, 95, 100, speed ranges in which exhaust gas packets of different cylinders are detected simultaneously by lambda sensor 50 in exhaust system branch 5 must be excluded from the diagnostic method according to the present invention. In this case, it is no longer possible to assign the erroneous operation of one or more intake valves to the respective cylinder or even to detect it.

Furthermore, due to the very short time intervals between the passage of two exhaust gas packets past lambda sensor 50 and the mixing of exhaust gas packets at higher speeds, an unambiguous diagnosis is no longer possible. Thus, for example, in the case of four cylinders as in the above-described exemplary embodiment, at an engine speed of 6000 rpm an exhaust gas packet flows by lambda sensor 50 approximately every 5 ms. The above-described sampling with the 1-ms time grid may result in the named problems. Therefore, it is recommended that a suitable upper limit be set for the speed range in which diagnosis according to the method according to the present invention is allowed, as a function of the sampling frequency when detecting the exhaust gas packets of different cylinders by lambda sensor 50 in exhaust system branch 5, in order to ensure the resolution of the exhaust gas packets of the different cylinders and their unambiguous assignment to these cylinders. The upper limit for the speed range may also be optionally calibrated on a test bench in this sense.

In addition, as the number of cylinders increases, the time interval between the exhaust gas packets of different cylinders at lambda sensor 50 becomes shorter. Therefore, the speed range in which the method according to the present invention may be carried out and in which the exhaust gas packets may be unambiguously assigned to the corresponding cylinders diminishes as the number of cylinders increases. Conversely, the speed range in which the method according to the present invention may be carried out and in which the exhaust gas packets may be unambiguously assigned to the corresponding cylinders increases as the number of cylinders decreases. In the ideal case, an exhaust system branch having its own lambda sensor is associated with each cylinder. In the latter case, the method according to the present invention with unambiguous assignment of the exhaust gas packets to the corresponding cylinders may be carried out independently of the engine speed. However, if several cylinders 10, 15, 20, 25 share lambda sensor 50 as shown in FIG. 1, it is recommended to set a suitable upper limit for the speed range in which the diagnostic method according to the present invention is allowed as a function of the number of cylinders to ensure the resolution of the exhaust gas packets of the different cylinders and their unambiguous assignment to these cylinders. The upper limit for the speed range may also be calibrated on a test bench in this sense.

Figure 2:
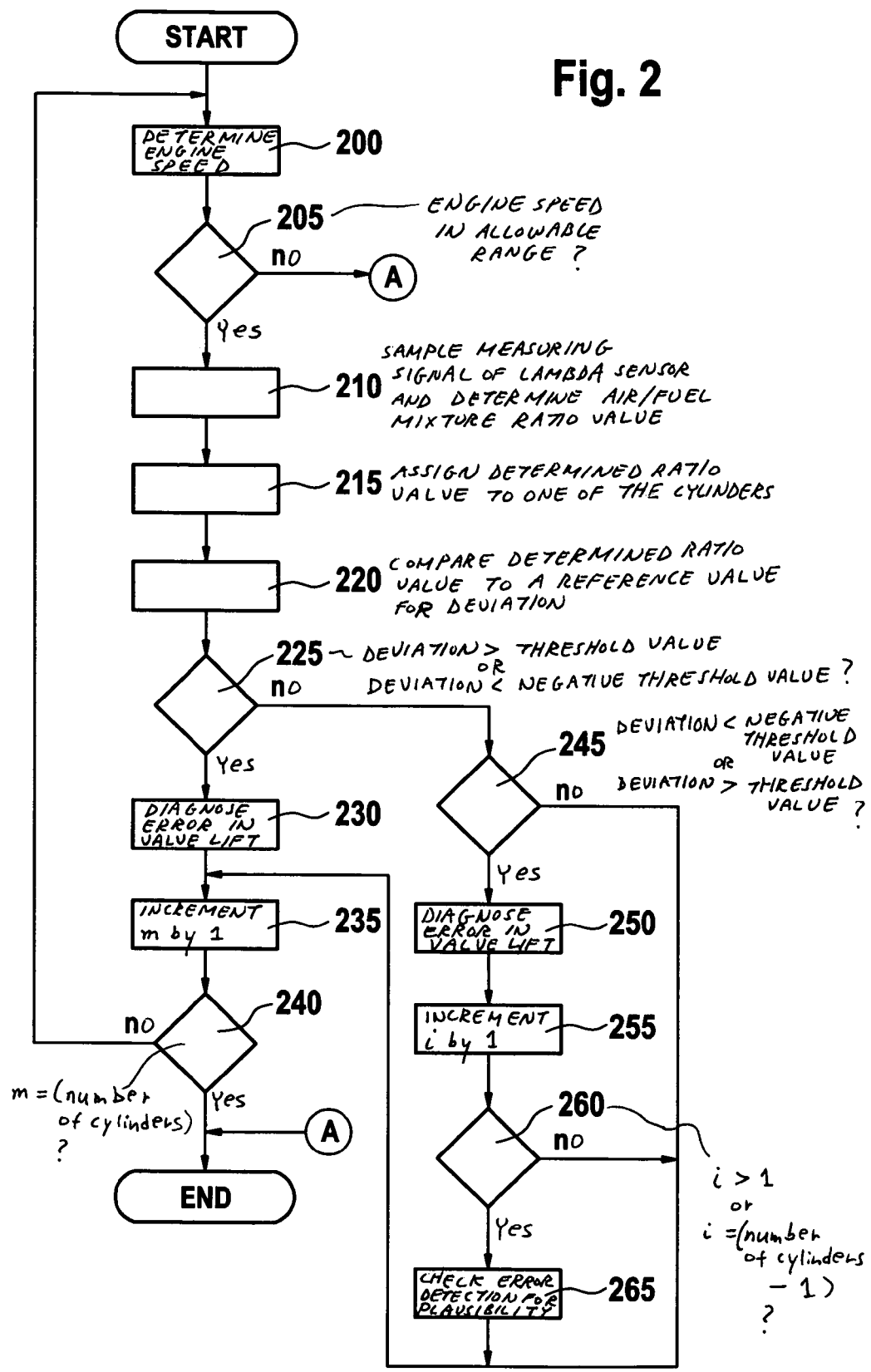
FIG. 2 shows a flow chart of an exemplary sequence of the method according to the present invention.

FIG. 2 shows a flow chart of an exemplary sequence of the method according to the present invention. The program is started with a valve lift switchover. At the start of the program, a first count variable i is initialized with the value zero. At the start of the program, a second count variable m is initialized with the value zero. At a program point 200, controller 110 determines, from the measuring signal of speed sensor 115, the instantaneous engine speed of internal combustion engine 1. The program subsequently branches to a program point 205.

At program point 205, controller 110 checks whether the engine speed is in a range in which the execution of the method according to the present invention is allowed. If this is the case, the program branches to program point 210; otherwise the program is terminated.

At program point 210, controller 110 samples the measuring signal of lambda sensor 50 in a predefined time grid of 1 ms, for example, at an appropriate point in time and uses this to determine a discrete value for the air/fuel mix ratio of a cylinder which is initially not identified. Subsequently the program branches to program point 215.

At program point 215, controller 110 assigns the value sampled in program point 210 and thus the similarly sampled exhaust gas packet to one of cylinders 10, 15, 20, 25 as described above as a function of the known firing sequence and the known run time of the exhaust gas packets. The program subsequently branches to program point 220.

At program point 220, controller 110 compares the determined values for the air/fuel mix ratio to the predefined lambda value by deducting the predefined lambda value from the determined value, for example, and thus determines a deviation. The program subsequently branches to program point 225.

In controller 110 it is known whether the valve lift switchover occurs from large lift to small lift or vice-versa. If the valve lift switchover occurs from large lift to small lift, controller 110 checks at program point 225 whether the deviation determined at program point 220 is greater than the above-described single threshold value, this single threshold value being greater than zero. If the deviation is greater, the program branches to program point 230, otherwise it branches to program point 245. If the valve lift switchover occurs from small lift to large lift, controller 110 checks at program point 225 whether the deviation determined at program point 220 is less than the above-described single negative threshold value. If the deviation is less, the program branches to program point 230, otherwise it branches to program point 245.

At program point 230, controller 110 diagnoses an error in the valve lift of the intake valve of the cylinder associated with the sampled exhaust gas packet. The program subsequently branches to program point 235.

At program point 235, controller 110 increments second count variable m by one. Subsequently the program branches to program point 240.

At program point 240, controller 110 checks whether second counter variable m is equal to the number of cylinders of combustion engine 105. If this is the case, the program is terminated, otherwise it branches back to program point 200.

If the valve lift switchover occurs from large lift to small lift, controller 110 checks at program point 245 whether the deviation determined at program point 220 is less than the above-described single negative threshold value. If this is the case, the program branches to program point 250, otherwise it branches to program point 235. If the valve lift switchover occurs from small lift to large lift, controller 110 checks at program point 245 whether the deviation determined at program point 220 is greater than the above-described single threshold value. If this is the case, the program branches to program point 250, otherwise it branches to program point 235.

At program point 250, controller 110 diagnoses an error in the valve lift of the intake valve of one of cylinders 10, 15, 20, 25 which is different from the cylinder whose exhaust gas packet was previously sampled. Therefore initially it is impossible to identify the cylinder having the defective intake valve for a number of cylinders greater than two. The program subsequently branches to program point 255.

At program point 255, controller 110 increments first count variable i by one. The program subsequently branches to program point 260.

At program point 260, controller 110 checks whether first counter variable i is greater than 1 or equal to the number of cylinders of combustion engine 105 minus one. If this is the case, the program branches to program point 265, otherwise it branches to program point 235.

At program point 265, controller 110 checks the error detection for plausibility, because an indication of a defective intake valve has been detected in at least two of cylinders 10, 15, 20, 25, the valves belonging to a cylinder which is different from those at least two cylinders. If first count variable i is equal to the number of cylinders of combustion engine 105 minus one, the cylinder having the defective intake valve may be identified, because it is the only one for which the program branch starting at program step 250 has not been run and, in addition, it has been determined by controller 110 that a cylinder having a defective intake valve exists, which is different from the cylinders diagnosed in the program branch starting at step 250. After program point 265, the program branches to program point 235.

What is claimed is:

1. A method for operating an internal combustion engine having at least one cylinder and at least one intake valve, the method comprising:
    determining at least one value which is representative of an air/fuel ratio in a specific cylinder in a cylinder-selective manner in an exhaust system branch of the engine;
    comparing the at least one value to a predefined value; and
    diagnosing an erroneous lift of at least one intake valve as a function of a deviation of the at least one value from the predefined value;
    wherein the exhaust system branch has an asymmetrical design and wherein at least one speed range of the engine in which exhaust gas packets of different cylinders are simultaneously detected in the exhaust system branch is excluded from the diagnosis.

2. The method according to claim 1, wherein the at least one value is determined using a lambda sensor in the exhaust system branch.

3. The method according to claim 1, wherein the at least one value is representative of the air/fuel ratio in a cylinder associated with an intake valve to be diagnosed.

4. The method according to claim 1, wherein the at least one value is representative of the air/fuel ratio in at least one cylinder other than a cylinder associated with an intake valve to be diagnosed.

5. The method according to claim 1, wherein the at least one value is associated with a cylinder as a function of a geometry of the exhaust system branch and a resulting cylinder-specific run time of exhaust gas packets and as a function of a firing sequence.

6. A method for operating an internal combustion engine having at least one cylinder and at least one intake valve, the method comprising:
    determining at least one value which is representative of an air/fuel ratio in a specific cylinder in a cylinder-selective manner in an exhaust system branch of the engine;
    comparing the at least one value to a predefined value; and
    diagnosing an erroneous lift of at least one intake valve as a function of a deviation of the at least one value from the predefined value;
    wherein an upper limit is set for a speed range in which diagnosis is allowed, as a function of a sampling frequency when detecting exhaust gas packets of different cylinders in the exhaust system branch.

7. A method for operating an internal combustion engine having at least one cylinder and at least one intake valve, the method comprising:
    determining at least one value which is representative of an air/fuel ratio in a specific cylinder in a cylinder-selective manner in an exhaust system branch of the engine;
    comparing the at least one value to a predefined value; and
    diagnosing an erroneous lift of at least one intake valve as a function of a deviation of the at least one value from the predefined value;
    wherein an upper limit is set for a speed range in which diagnosis is allowed, as a function of a number of cylinders.

8. The method according to claim 1, wherein the at least one value is a lambda value.

* * * * *